(12) United States Patent
Tedrow

(10) Patent No.: US 11,988,307 B2
(45) Date of Patent: May 21, 2024

(54) ANTI-ROTATION FLUID CONNECTION

(71) Applicant: ASML Netherlands B.V., Veldhoven (NL)

(72) Inventor: Jon David Tedrow, San Diego, CA (US)

(73) Assignee: ASML Netherlands B.V., Veldhoven (NL)

( * ) Notice: Subject to any disclaimer, the term of this patent is extended or adjusted under 35 U.S.C. 154(b) by 451 days.

(21) Appl. No.: 17/270,649

(22) PCT Filed: Aug. 12, 2019

(86) PCT No.: PCT/EP2019/071530
§ 371 (c)(1),
(2) Date: Feb. 23, 2021

(87) PCT Pub. No.: WO2020/057858
PCT Pub. Date: Mar. 26, 2020

(65) Prior Publication Data
US 2021/0254765 A1    Aug. 19, 2021

Related U.S. Application Data

(60) Provisional application No. 62/732,810, filed on Sep. 18, 2018.

(51) Int. Cl.
*F16L 19/02*     (2006.01)
*F16L 21/04*     (2006.01)

(52) U.S. Cl.
CPC .................................. *F16L 21/04* (2013.01)

(58) Field of Classification Search
CPC . F16L 21/04; F16L 21/02; F16L 19/02; F16L 19/025; F16L 19/0206;
(Continued)

(56) References Cited

U.S. PATENT DOCUMENTS

| 1,504,363 | A | * | 8/1924 | Madigan | ............... F16L 19/02 |
| | | | | | 285/259 |
| 4,645,245 | A | | 2/1987 | Cunningham | |

(Continued)

FOREIGN PATENT DOCUMENTS

| CN | 202561304 U | 11/2012 |
| CN | 103968163 A | 8/2014 |

(Continued)

OTHER PUBLICATIONS

Office Action, counterpart Chinese Patent Application No. 201980060891.0, dated Jul. 8, 2023, 15 pages total (including partial English translation of 9 pages).

(Continued)

*Primary Examiner* — Aaron M Dunwoody
(74) *Attorney, Agent, or Firm* — DiBerardino McGovern IP Group LLC

(57) ABSTRACT

Disclosed is a connector for connecting one fluid handling device (52) such as a conduit to another fluid handling device (70) such as another conduit in which the faces of fittings (54) attached to glands (50) in the connector are given complementary mating configurations (58, 60, 82) so they can mesh that lack circular symmetry so that the faces do not rotate with respect to one another when the faces are subjected to torque when a connection is being made.

23 Claims, 8 Drawing Sheets

(58) Field of Classification Search
CPC ... F16L 19/0212; F16L 19/0218; F16L 19/06; F16L 19/065; F16L 19/0653; F16L 19/07
See application file for complete search history.

(56) References Cited

U.S. PATENT DOCUMENTS

| | | | |
|---|---|---|---|
| 4,685,490 | A | 8/1987 | Medvick et al. |
| 5,004,714 | A | 4/1991 | Claar |
| 5,060,987 | A | 10/1991 | Miller |
| 5,066,051 | A * | 11/1991 | Weigl ............ F16L 19/0212 285/379 |
| 5,713,607 | A | 2/1998 | Webb |
| 6,361,687 | B1 | 3/2002 | Ford et al. |
| 9,625,040 | B2 | 4/2017 | Thomas |
| 2001/0052362 | A1 | 12/2001 | Hasak et al. |
| 2002/0024219 | A1 | 2/2002 | Eidsmore |
| 2014/0210205 | A1 | 7/2014 | Yamada et al. |
| 2015/0137513 | A1 | 5/2015 | Glime, III et al. |
| 2016/0281892 | A1 | 9/2016 | Arstein et al. |
| 2016/0356408 | A1 | 12/2016 | Sneh |
| 2019/0086817 | A1 | 3/2019 | Bessems et al. |

FOREIGN PATENT DOCUMENTS

| | | |
|---|---|---|
| CN | 204284508 U | 4/2015 |
| DE | 4227319 A1 | 2/1994 |
| EP | 0439328 A2 | 7/1991 |
| JP | S62093589 A | 4/1987 |
| JP | S62180189 A | 8/1987 |
| JP | S62194989 U | 12/1987 |
| JP | S63158683 U | 10/1988 |
| JP | H04228989 A | 8/1992 |
| JP | H04351392 A | 12/1992 |
| JP | H06067987 U | 9/1994 |
| JP | H10288288 A | 10/1998 |
| JP | 2002509231 A | 3/2002 |
| JP | 2002340249 A | 11/2002 |
| KR | 200337739 Y1 | 1/2004 |

OTHER PUBLICATIONS

Office Action, counterpart Taiwanese Patent Application No. 108129555, dated Mar. 2, 2023, 14 pages total (including English translation of 6 pages).

Alexandra Cross, European Patent Office International Searching Authority, International Search Report and Written Opinion, corresponding PCT Application No. PCT/EP2019/071530, dated Jan. 28, 2020, 20 pages total.

Office Action, counterpart Chinese Patent Application No. 201980060891.0, dated Jan. 5, 2023, 15 pages total (including English translation of 9 pages).

Office Action, counterpart Chinese Patent Application No. 201980060891.0, dated Jun. 20, 2022, 12 pages total (including English translation of 7 pages).

Japanese Patent Office, Office Action, counterpart Japanese Patent Application No. 2021-509970; dated Sep. 13, 2023, 18 total pages (including 10 pages of English translation).

\* cited by examiner

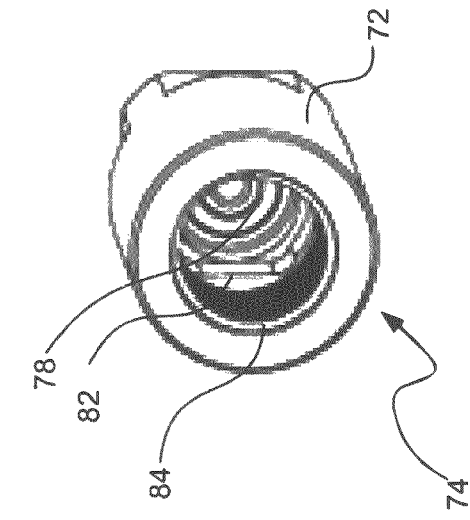
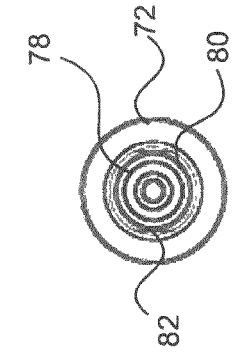
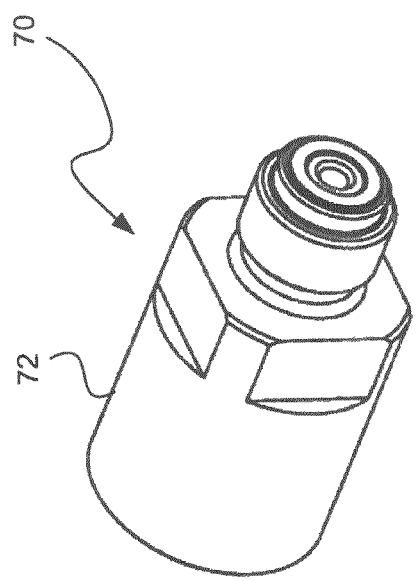
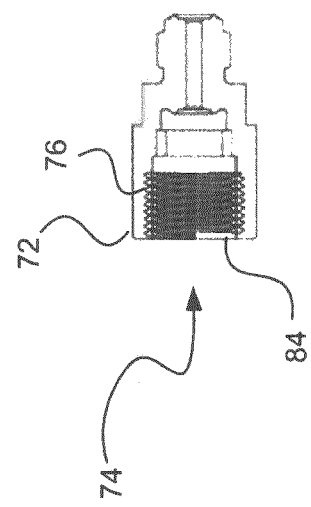
FIG. 2B
FIG. 2D
FIG. 2A
FIG. 2C

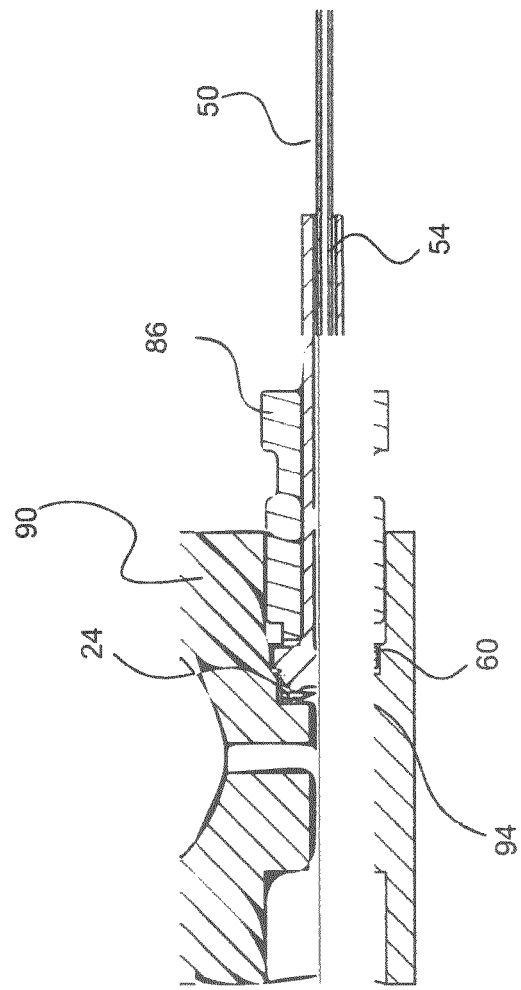
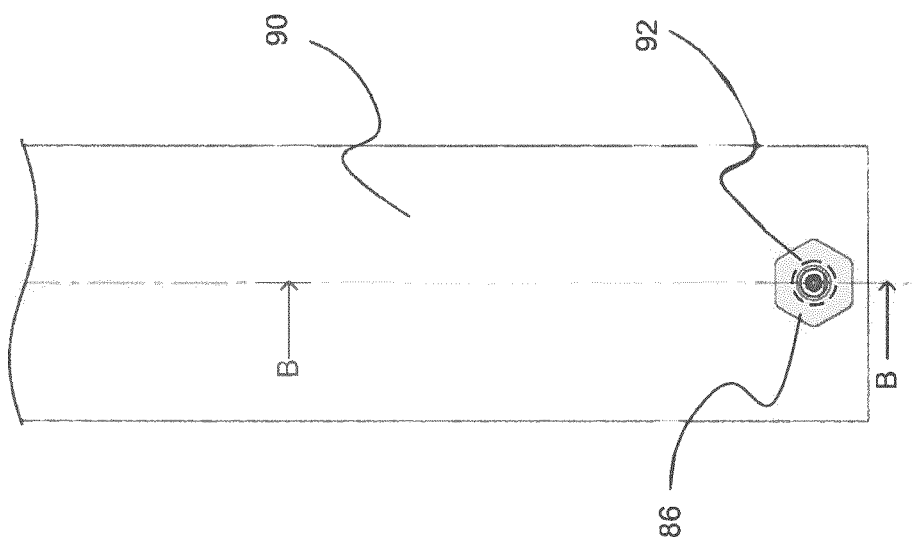
FIG. 5B
FIG. 5A

ANTI-ROTATION FLUID CONNECTION

CROSS-REFERENCE TO RELATED APPLICATIONS

This application claims priority of U.S. application 62/732,810 which was filed on Sep. 18, 2018 and which is incorporated herein in its entirety by reference.

FIELD

The present disclosure relates to connections for conveying a fluid in the form of a gas or liquid from one location to another, such as from one conduit to another, that use compressive coupling to maintain a seal.

BACKGROUND

It is commonly necessary to connect to a length of conduit such as a tube or pipe either to another conduit or to an inlet or outlet of a fluid handling or containing device. When the fluid to be conveyed is under high or low (e.g., vacuum) pressure, or is hazardous, it is especially desirable that the connection be extremely strong, durable, and able to maintain its seal. It is also desirable that such a connection can be made or broken multiple times without damaging the connection.

One common type of connector which has been adapted to suit these needs is shown in FIG. 7. As shown in FIG. 7, a coupling assembly 10 includes a first gland 12 and a second gland 14. The first gland 12 has a fitting 28 and a sealing face 16 and the second gland 14 has a fitting 30 and a sealing face 18. The glands 12, 14 are coupled by bringing the sealing faces into engagement with facing surfaces of a sealing member 20. Each sealing face 16, 18 typically includes a circumferential bead for engaging the sealing member 20. The arrangement also includes a first threaded member 24 (e.g., female nut) and second threaded member 26 (e.g., male nut or body). When the threaded members 24, 26 are engaged and one is rotated relative the other they contact radial shoulders 31, 32 on the ends of the glands 12, 14 and apply a compressive force to the glands 12, 14 urging them together. In some implementations the sealing member 20 is a metal gasket.

As can be discerned, completing a connection using an arrangement such as that just described will tend to impart unequal rotational forces (torque) to the sealing faces 16, 18 that will tend to cause relative rotation of the sealing faces 16, 18 and/or sealing member 20 unless measures are undertaken to prevent it. Otherwise, the rotation may cause scoring or galling of the sealing end faces 16, 18 which will limit the quality and lifetime of the seal produced by the coupling assembly 10. Galling is a form of wear caused by adhesion between sliding surfaces. When a material galls, some of it is pulled with the contacting surface, especially if there is a large amount of force compressing the surfaces together.

There is therefore a need for a coupling arrangement in which the end faces do not rotate with respect to one another, thus preventing undesirable effects such as galling.

SUMMARY

The following presents a simplified summary of one or more embodiments in order to provide a basic understanding of the embodiments. This summary is not an extensive overview of all contemplated embodiments and is not intended to identify key or critical elements of all embodiments nor set limits on the scope of any or all embodiments. Its sole purpose is to present some concepts of one or more embodiments in a simplified form as a prelude to the more detailed description that is presented later.

According to one aspect of an embodiment there is disclosed a coupling arrangement in which one fitting has a first configuration at its axial end and the other fitting has a second complementary, mating configuration on its axial end such that when the two ends are axially engaged the fittings mesh axially. The first and second configurations lack circular symmetry. Here and elsewhere circular symmetry refers to a configuration having a continuous symmetry that can be rotated by any arbitrary angle and map onto itself, that is, look the same. This is in contrast to rotational symmetry which maps onto itself only with rotations of set numbers of degrees. Lack of circular symmetry is specified here so that the first fitting is inhibited from turning (e.g., prevented from turning) with respect to the second fitting when they are axially engaged despite the application of unequal rotational forces to the fittings According to another aspect of an embodiment there is disclosed an anti-rotation fitting that uses a keyed aperture on a female connection side and a fitting with flats on the male side. Flats on the fitting engage with the aperture and prevent any rotation between the two parts.

Further embodiments, features, and advantages of the subject matter of the present disclosure, as well as the structure and operation of the various embodiments are described in detail below with reference to accompanying drawings.

BRIEF DESCRIPTION OF THE DRAWING

FIG. 2A is a perspective view of a gland having a fitting for making a connection to the fitting of FIG. 1A according to aspects of an embodiment.

FIG. 2B is a perspective view from a different angle of the gland having a fitting of FIG. 2A.

FIG. 2C is a cutaway view of the gland having a fitting shown in FIG. 2A.

FIG. 2D is an end-on view of the gland having a fitting shown in FIG. 2A.

FIG. 5A is a side elevation of a body having an orifice including a fitting and sleeve according to an aspect of an embodiment.

FIG. 5B is a cutaway view taken along line B-B in FIG. 5A.

Figure 1A:
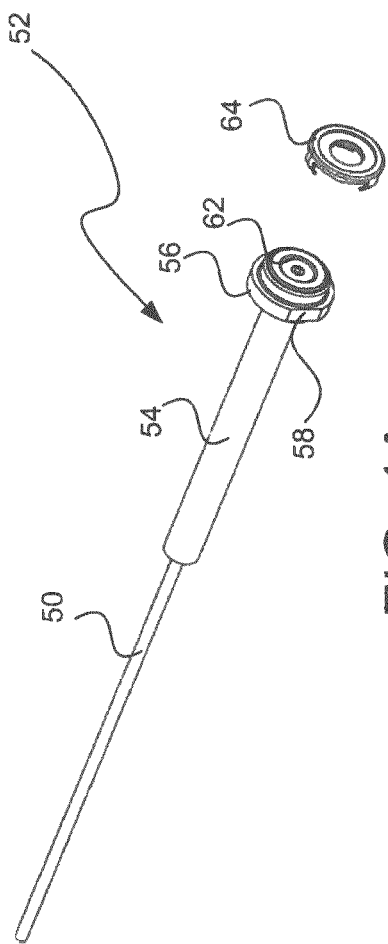
FIG. 1A is a perspective view of a conduit with a gland having a fitting according to aspects of an embodiment.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art based on the teachings contained herein.

DETAILED DESCRIPTION

Various embodiments are now described with reference to the drawings, wherein like reference numerals are used to refer to like elements throughout. In the following description, for purposes of explanation, numerous specific details are set forth in order to promote a thorough understanding of one or more embodiments. It may be evident in some or all instances, however, that any embodiment described below can be practiced without adopting the specific design details described below. In the description that follows and in the claims the terms "up," "down," "top," "bottom," "vertical," "horizontal," and like terms may be employed. These terms are intended to show relative orientation only and not any orientation with respect to gravity unless otherwise indicated.

Figure 1C:
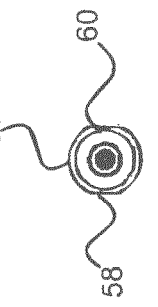
FIG. 1C is an end-on view of the conduit with a gland having a fitting shown in FIG. 1A.
Figure 1B:
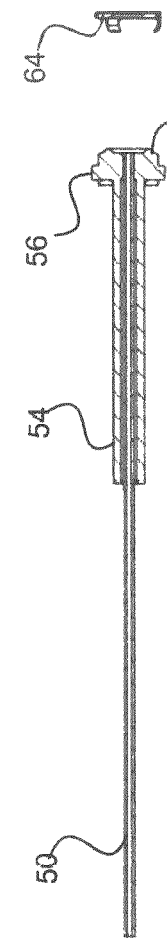
FIG. 1B is a cutaway view of the conduit with a gland having a fitting shown in FIG. 1A.
Figure 3A:
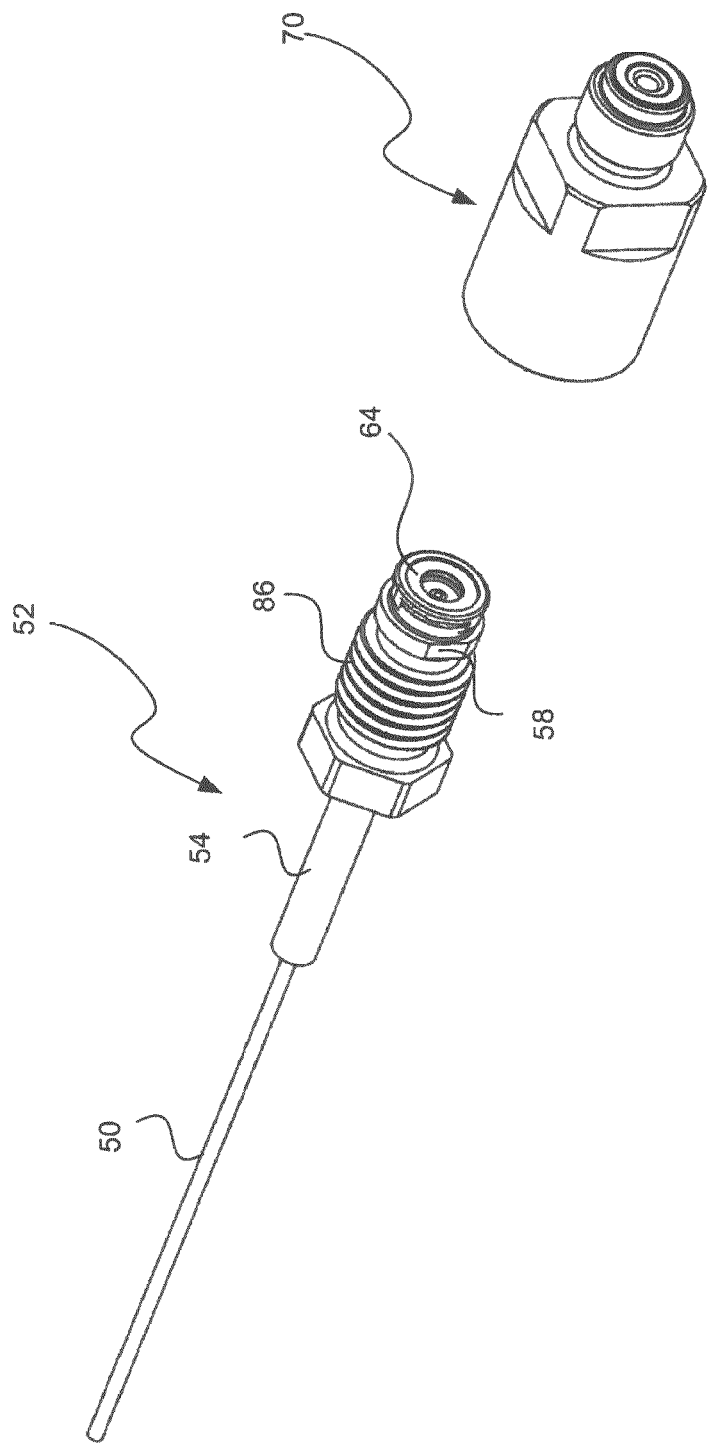
FIG. 3A is a perspective view of the fitting of FIG. 1A with the fitting of FIG. 2B in an uncoupled state according to an aspect of an embodiment.
Figure 3D:
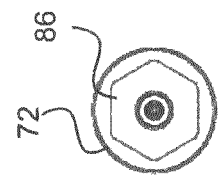
FIG. 3D is an end-on view of the arrangement of FIG. 3A.
Figure 3C:
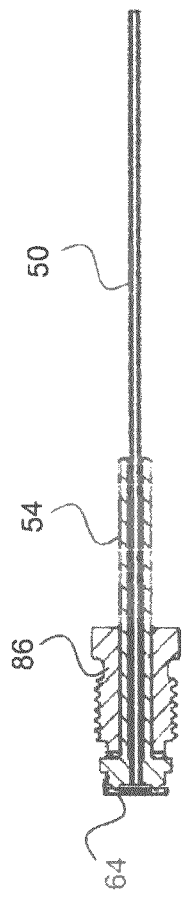
FIG. 3C is a cutaway view of the male fitting of FIG. 3A.
Figure 3B:
FIG. 3B is a perspective view from a different angle of the fitting of FIG. 1A with the fitting of FIG. 2B in an uncoupled state according to an aspect of an embodiment.

With initial reference to FIGS. 1A-C there is shown a conduit 50 with a first coupling subassembly 52. The first coupling subassembly 52 includes a fitting 54 with a shoulder 56. In the example shown, the shoulder 56 is in the form of a doubly truncated circle with two flat areas 58 and 60. The fitting 54 also includes a sealing face 62. Also shown is a sealing member 64.

FIGS. 2A-D show a second coupling subassembly 70 including a fitting body 72 having structure defining a pocket 74 in which is arranged an internal fitting 76 with a sealing face 78. The internal fitting 76 has structure defining an aperture with a configuration that is complementary to the configuration of the fitting 54 such that the fitting 54 can be inserted axially into the internal fitting 76 but is inhibited from rotating with respect to the internal fitting 76 once inserted. In the example where the fitting 54 is configured as a doubly truncated circle, then the aperture in the internal fitting 76 is also configured as a doubly truncated circle with a slightly larger diameter. Thus the internal fitting 76 has internal stops 80 and 82.

Figure 7:
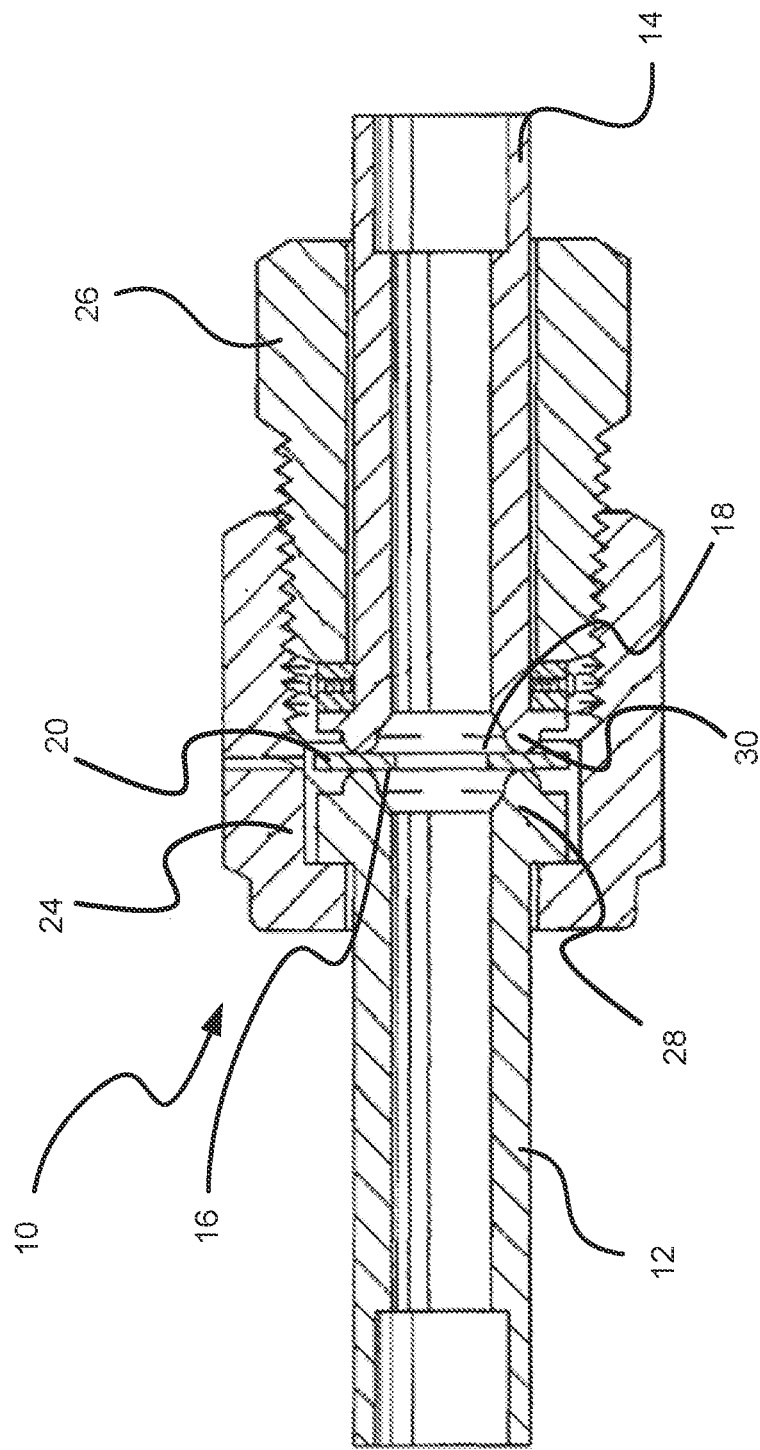
FIG. 7 is a cutaway view of a conventional coupling arrangement.

In other words, the fitting 54 with flat areas 58, 60 has a first configuration. The aperture of the internal fitting 76 as defined by the stops 80 and 82 has a second configuration. The first configuration and the second configuration are designed to be complementary so fitting 54 can be axially inserted into the fitting 76. The first configuration and the second configuration are also selected so that they do not have continuous circular symmetry. Thus, for example, when fitting 54 is inserted into the internal fitting 76, the flat areas 58 and 60 engage with the stops 80 and 82 to inhibit any relative rotation between the two parts. The components as described above would then be used in a coupling arrangement as described above in connection with FIG. 7.

Figure 4A:
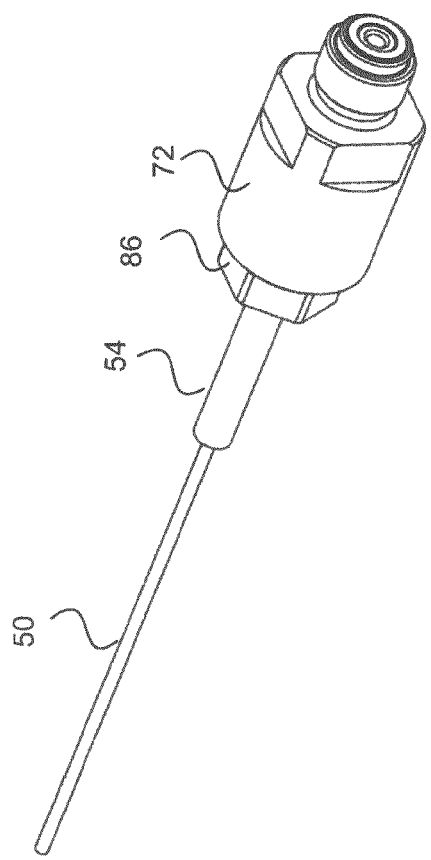
FIG. 4A is a perspective view of the fitting of FIG. 1A with the fitting of FIG. 2B in a coupled state according to an aspect of an embodiment.
Figure 4C:
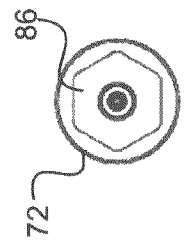
FIG. 4C is an end-on view of the arrangement of FIG. 4A.
Figure 4B:
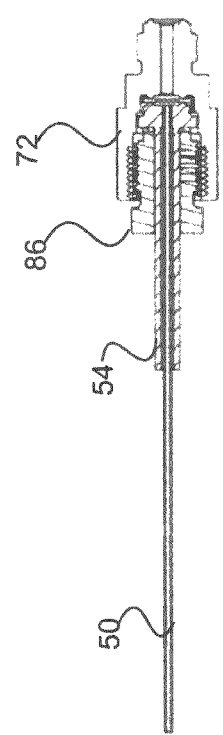
FIG. 4B is a cutaway view of the arrangement of FIG. 4A.

In one possible arrangement the second coupling subassembly 70 also includes internal threads 84 and the first coupling subassembly 52 is provided with a sleeve 86 which is rotatable around the first coupling subassembly 52 and has external threading. This is shown in FIGS. 3A-D. The sealing member 64 is placed on the fitting 54 and the combination is then axially inserted into the second coupling subassembly 70 and the externally threaded sleeve 86 is brought into engagement with the internal threads of the second coupling subassembly 70. The externally threaded sleeve 86 is then turned to apply an axial compressive force to the fittings tending to force them together as shown in FIGS. 4A-C. The fittings do not turn while the connection is being made, however, due to the meshing structure.

In the above example, the configuration of the fittings is arbitrary so long as the configuration of one of the fittings rotationally engages with the configuration of the other fitting. It will thus be appreciated that arrangements other than the flat area and stops arrangement described above may be used. Also, the arrangement described above has mirror symmetry but this is not necessary. One flat on the male fitting and one stop in the female fitting may be used as well. The advantage of the arrangement shown is that the mirror symmetry provides two possible orientations for a meshing connection, and the presence of two shoulders provides additional mechanical resistance to rotation.

The above description is in terms of connecting a first coupling subassembly to a second coupling subassembly. It will be understood that the disclosed subject matter can also be used in applications in which a conduit is to be connected to an orifice (i.e., inlet or outlet) of a body such as a valve, pump, fluid source, or vacuum chamber. This is shown in FIGS. 5A and 5B. FIG. 5A shows a body 90 having an orifice 92. FIG. 5B is a cutaway view taken along line B-B in FIG. 5A. As can be seen, the orifice 92 is dimensioned to receive the first coupling subassembly 52. The orifice 92 also includes structure that defines an orifice internal fitting 94 that has a configuration that is complementary to the configuration of the fitting 54 of the first coupling subassembly 52. This configuration may be created directly in the orifice 92 or may be introduced by placing and securing an insert in the orifice 92 that provides the required structure. The orifice 92 may also include internal threading (not shown) that engages with external threading (not shown) on the sleeve 86 of the first coupling subassembly 52 to secure the first coupling subassembly 52 in the orifice 92. In making a connection, a sealing member 64 is placed on the first coupling subassembly 52 and then the first coupling subassembly 52 is inserted into the orifice 92 with the internal fitting 94. The sleeve 86 is then turned to secure the first coupling subassembly 52 in the orifice 92 and to apply an axially compressive force to the combination of the sealing faces and the sealing member between them. This produces a compressive force on the fittings but they do not rotate because of their mating interlocking configurations.

Figure 6A:
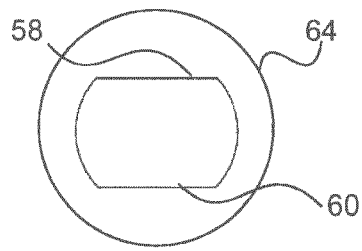
FIGS. 6A-6H are end-on views of configurations of various fittings according to aspects of embodiments.
Figure 6B:
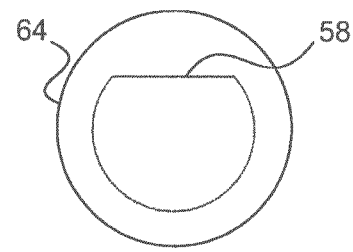
Figure 6C:
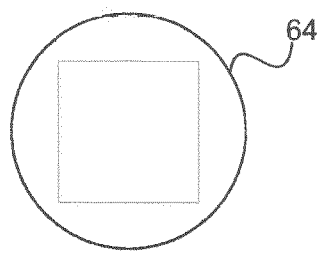
Figure 6D:
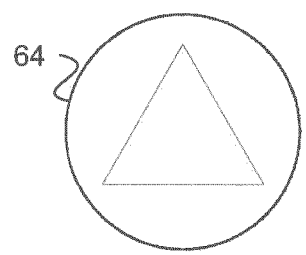
Figure 6E:
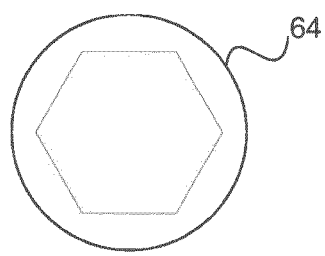
Figure 6F:
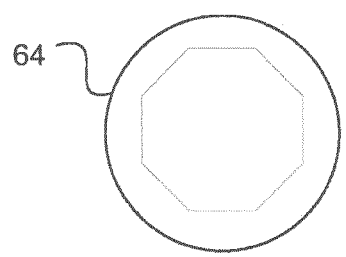
Figure 6G:
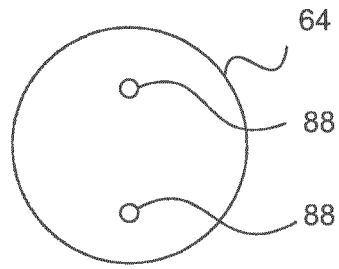
Figure 6H:
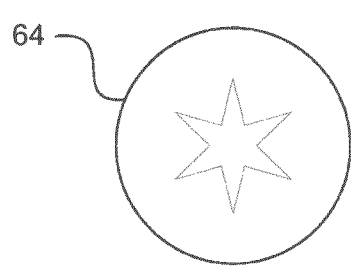

The mating interlocking configurations can be any shape that lacks circular symmetry. Some nonexhaustive and non-limiting examples of such shapes are shown in FIGS. 6A-6H. FIG. 6A shows the doubly truncated circle described in connection with the example above. FIG. 6B shows the singly truncated circle mentioned above. FIG. 6C shows a rectangular configuration. FIG. 6D shows a triangular configuration. FIG. 6E shows a hexagonal configuration. FIG. 6F shows an octagonal configuration. FIG. 6G shows a configuration with two pins 88. FIG. 6H shows a six-pointed star configuration. Note that these configurations may exhibit rotational symmetry in that they can be re-oriented into a matching arrangement when rotated by a specified number of degrees. For example, the hexagon of FIG. 6E can be rotated 60° into a matching orientation. None, however, can be rotated any arbitrary angle and appear the same. It will be apparent to one of ordinary skill in the art that there are other configurations lacking circular symmetry that would be suitable.

The above description is also in terms of rotational coupling elements that are threaded but the principles described above may be applied to other types of rotational coupling elements in which rotation is used to make the connection such as bayonet-type connections.

A connection such as that described above provides several benefits. For example, galling is prevented during making a connection. This not only ensures a better seal, but it also increases the number of times the connection can be made, unmade, and remade. Also the connection is able to maintain a specific relative position or orientation of the two mating parts.

The components of this system may be made of multiple refractory metals with fittings that are welded in place. For example, the conduit 50 may be made of TaW2.5 (2.5% tungsten) and components of the coupling subassembly 52 may be made of TaW10 (10% tungsten). Using such a material for the coupling subassembly provides for a fitting with a higher hardness level which prolongs the life of the sealing surfaces.

Described above is an arrangement including a first rotational coupling element, in the example, an externally threaded male nut. The threaded first rotational element is arranged to impart a compressive force to a first fitting of a first coupling subassembly when a rotational coupling element is engaged with a rotational coupling element of a second coupling subassembly with a second fitting. The second fitting is configured (shaped and dimensioned) to receive the first fitting such that the first fitting and the second fitting at least partially rotationally engage to inhibit axial rotation of the first fitting with respect to the second fitting.

The above description includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is construed when employed as a transitional word in a claim. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

Other aspects of the invention are set out in the following numbered clauses.

1. Apparatus comprising:
    a first coupling subassembly extending in an axial direction, the first coupling subassembly including a fitting arranged at an axial end of the first coupling subassembly; and
    a rotational coupling element rotatably surrounding the first coupling subassembly and adapted to be engaged with the fitting such that the rotational coupling element is rotatable with respect to the fitting but axially engageable with the fitting to apply an axial compressive force to the fitting,
    the fitting having a face with a first configuration such that when the fitting is received in a second fitting when the fitting and the second fitting are brought into axial engagement by rotation of the rotational coupling element, the fitting and the second fitting at least partially rotationally engage to inhibit axial rotation of the fitting with respect to the second fitting.
2. Apparatus as in clause 1 wherein the first configuration lacks circular symmetry.
3. Apparatus as in clause 1 wherein the first rotational coupling element comprises an externally threaded sleeve.
4. Apparatus as in clause 1 wherein the first configuration has an external outline of a circle with at least one truncation.
5. Apparatus as in clause 1 wherein the fitting comprises a refractory metal.
6. Apparatus as in clause 5 wherein the refractory metal comprises a tantalum tungsten alloy.
7. Apparatus as in clause 6 wherein the tantalum tungsten alloy comprises TaW10.
8. Apparatus comprising:
    a first rotational coupling element;
    a first fitting adapted to be axially engaged with the first rotational coupling element;
    a second rotational coupling element; and
    a second fitting adapted to be axially engaged with the second rotational coupling element and with the first fitting;
    the first fitting having a first configuration and the second fitting having a second configuration, the first and second configurations being such that the first fitting is received in the second fitting when the first fitting and the second fitting are brought into axial engagement by relative rotation of the first and second rotational coupling elements, wherein the first fitting and the second fitting at least partially rotationally engage to prevent axial rotation of the first fitting with respect to the second fitting.
9. Apparatus as in clause 8 wherein the first configuration and the second configuration lack circular symmetry.
10. Apparatus as in clause 8 wherein the first configuration is complementary to the second configuration.
11. Apparatus as in clause 10 wherein the first configuration and the second configuration lack circular symmetry.
12. Apparatus as in clause 8 wherein the first rotational coupling element comprises an externally threaded sleeve and the second rotational coupling element comprises an internally threaded sleeve.
13. Apparatus as in clause 8 wherein the first configuration has an external outline of a circle with at least one truncation and wherein the second configuration comprises a pocket having an internal outline of a circle with at least one truncation.
14. Apparatus as in clause 8 wherein the first configuration has an external outline of a circle with at least two truncations and wherein the second configuration comprises a pocket having an internal outline of a circle with at least two truncations.
15. Apparatus as in clause 8 wherein the first fitting is connected to a first gland and the second fitting is disposed in a structure defining an orifice in a device.

16. Apparatus as in clause 15 wherein the device is a valve.
17. Apparatus as in clause 15 wherein the device is a pump.
18. Apparatus as in clause 15 wherein the device is a vacuum chamber.
19. Apparatus comprising a first fitting having a sealing element with an external configuration, the sealing element having a sealing face and being dimensioned to be insertable into an aperture in a second fitting, the aperture having a second configuration which is complementary to the first configuration, the first configuration and the second configuration being such that the sealing element is not rotatable with respect to the aperture when the sealing member is inserted into the aperture.
20. Apparatus as in clause 19 wherein the external configuration lacks circular symmetry.
21. Apparatus as in clause 19 wherein the external configuration has an external outline of a circle with at least one truncation.
22. Apparatus as in clause 19 further comprising a first rotational coupling element adapted to rotate around the sealing element and to engage with a second rotational coupling element arranged around the second fitting and to apply a compressive sealing force to the sealing element when engaged with the second rotational coupling element.
23. Apparatus as in clause 22 wherein the first rotational coupling element has an external thread and the second rotational coupling element has an internal thread and wherein the first rotational coupling element is adapted to engage with the second rotational coupling element by having the external thread engaged with the internal thread.

What is claimed is:

1. Apparatus comprising:
a first coupling subassembly extending in an axial direction, the first coupling subassembly including a fitting arranged at an axial end of the first coupling subassembly; and
a rotational coupling element rotatably surrounding the first coupling subassembly and adapted to be engaged with the fitting such that the rotational coupling element is rotatable with respect to the fitting but axially engageable with the fitting to apply an axial compressive force to the fitting,
the fitting comprising a refractory metal and having a face with a first configuration such that when the fitting is received in a second fitting when the fitting and the second fitting are brought into axial engagement by rotation of the rotational coupling element, the fitting and the second fitting at least partially rotationally engage to inhibit axial rotation of the fitting with respect to the second fitting.

2. Apparatus as claimed in claim 1 wherein the first configuration lacks circular symmetry.
3. Apparatus as claimed in claim 1 wherein the rotational coupling element comprises an externally threaded sleeve.
4. Apparatus as claimed in claim 1 wherein the first configuration is a singly truncated circle.
5. Apparatus as claimed in claim 1 wherein the refractory metal comprises a tantalum tungsten alloy.
6. Apparatus as claimed in claim 5 wherein the tantalum tungsten alloy comprises TaW10.
7. Apparatus as claimed in claim 5 wherein the tantalum tungsten alloy comprises ten percent tungsten.

8. Apparatus comprising:
a first rotational coupling element;
a first fitting adapted to be axially engaged with the first rotational coupling element;
a second rotational coupling element;
a second fitting adapted to be axially engaged with the second rotational coupling element and with the first fitting,
the first fitting having a first configuration and the second fitting having a second configuration, the first and second configurations being such that the first fitting is received in the second fitting when the first fitting and the second fitting are brought into axial engagement by relative rotation of the first and second rotational coupling elements, wherein the first fitting and the second fitting at least partially rotationally engage to prevent axial rotation of the first fitting with respect to the second fitting;
a conduit; and
a device having a structure defining an orifice,
the first fitting being connected to the conduit and the second fitting being disposed in the structure defining the orifice in the device.

9. Apparatus as claimed in claim 8 wherein the first configuration and the second configuration lack circular symmetry.
10. Apparatus as claimed in claim 8 wherein the first configuration is complementary to the second configuration.
11. Apparatus as claimed in claim 10 wherein the first configuration and the second configuration lack circular symmetry.
12. Apparatus as claimed in claim 8 wherein the first rotational coupling element comprises an externally threaded sleeve and the second rotational coupling element comprises an internally threaded sleeve.
13. Apparatus as claimed in claim 8 wherein the first configuration is a singly truncated circle and wherein the second configuration comprises a pocket having an internal outline of a singly truncated circle.
14. Apparatus as claimed in claim 8 wherein the first configuration and wherein the second configuration comprises a pocket having an internal outline of a doubly truncated circle.
15. Apparatus as claimed in claim 8 wherein the device is a valve.
16. Apparatus as claimed in claim 8 wherein the device is a pump.
17. Apparatus as claimed in claim 8 wherein the device is a vacuum chamber.
18. Apparatus comprising:
a conduit comprising a first refractory metal;
a first fitting comprising a second refractory metal different from the first refractory metal and connected to the conduit, the first conduit having a sealing element with an external configuration, the sealing element having a sealing face;
a second fitting having an aperture having a second configuration which is complementary to the first configuration, the first configuration and the second configuration being such that the sealing element is not rotatable with respect to the aperture when the sealing member is inserted into the aperture.
19. Apparatus as claimed in claim 18 wherein the external configuration is a singly truncated circle.
20. Apparatus as claimed in claim 18 further comprising a first rotational coupling element adapted to rotate around the sealing element and to engage with a second rotational coupling element arranged around the second fitting and to apply a compressive sealing force to the sealing element when engaged with the second rotational coupling element.

21. Apparatus as claimed in claim 20 wherein the first rotational coupling element has an external thread and the second rotational coupling element has an internal thread and wherein the first rotational coupling element is adapted to engage with the second rotational coupling element by having the external thread engaged with the internal thread.

22. Apparatus as claimed in claim 18 wherein the first refractory metal comprises a first tantalum tungsten alloy and wherein the second refractory metal comprises a second tantalum tungsten alloy.

23. Apparatus as claimed in claim 22 wherein the first tantalum tungsten alloy comprises TaW2.5 and wherein the second tantalum tungsten alloy comprises TaW10.

\* \* \* \* \*